United States Patent
Henry et al.

(10) Patent No.: US 11,729,119 B2
(45) Date of Patent: Aug. 15, 2023

(54) DYNAMIC QUEUE MANAGEMENT OF NETWORK TRAFFIC

(71) Applicant: Cisco Technology, Inc., San Jose, CA (US)

(72) Inventors: Jerome Henry, Pittsboro, NC (US); Robert Edgar Barton, Richmond (CA)

(*) Notice: Subject to any disclaimer, the term of this patent is extended or adjusted under 35 U.S.C. 154(b) by 65 days.

(21) Appl. No.: 17/530,376

(22) Filed: Nov. 18, 2021

(65) Prior Publication Data
US 2023/0155964 A1    May 18, 2023

(51) Int. Cl.
*H04L 49/00* (2022.01)
*H04L 49/9005* (2022.01)

(52) U.S. Cl.
CPC .............. *H04L 49/9005* (2013.01)

(58) Field of Classification Search
CPC ......... H04L 43/0888; H04L 47/2475; H04L 47/2483; H04L 47/6295; H04L 47/781; H04L 49/30; H04L 49/9047; H04L 49/9005
USPC ....................................................... 370/412
See application file for complete search history.

(56) References Cited

U.S. PATENT DOCUMENTS

| | | | | |
|---|---|---|---|---|
| 2004/0136379 A1* | 7/2004 | Liao | ............. | H04L 47/781 370/254 |
| 2013/0286834 A1* | 10/2013 | Lee | ............. | H04L 47/60 370/235 |
| 2015/0046506 A1* | 2/2015 | Park | ............. | G06F 9/5083 709/201 |
| 2015/0058404 A1* | 2/2015 | Agrawal | ............. | H04L 67/1008 709/203 |
| 2015/0244639 A1* | 8/2015 | Iordache | ............. | H04L 47/30 370/230 |
| 2016/0241484 A1* | 8/2016 | De Schepper | ............. | H04L 47/196 |
| 2017/0019343 A1* | 1/2017 | De Schepper | ............. | H04L 47/31 |
| 2018/0191642 A1 | 7/2018 | Biederman et al. | | |
| 2019/0140984 A1 | 5/2019 | Agarwal et al. | | |
| 2019/0173841 A1 | 6/2019 | Wang et al. | | |
| 2020/0028792 A1* | 1/2020 | Holla | ............. | H04L 47/125 |
| 2022/0014474 A1* | 1/2022 | Yanev | ............. | H04L 12/5601 |

FOREIGN PATENT DOCUMENTS

BR    102019009234    11/2020
EP    2991290 A1 *    3/2016    ............. H04L 47/31

OTHER PUBLICATIONS

Baklizi, M. "Weight Queue Dynamic Active Queue Management Algorithm". Symmetry, 12(12), Dec. 14, 2020 16 pages.

* cited by examiner

Primary Examiner — Robert J Lopata
(74) Attorney, Agent, or Firm — Lee & Hayes, P.C.

(57) ABSTRACT

Techniques and systems described herein relate to network system queue management and dynamic real-time re-allocation of resources to prevent oversubscription and packet loss due to oversubscription. The techniques and systems enable monitoring of traffic and initial identification of queues at risk for oversubscription based on a rate of change of traffic load on the queue in advance of oversubscription occurring. After identifying a queue at risk for oversubscription, an Extended Berkeley Packet Filter or other similar component performs a likelihood determination using predictive algorithm techniques to identify a likelihood of oversubscription in the near future and re-allocates to parallel queues for efficient and loss-free use of the queues.

20 Claims, 6 Drawing Sheets

DYNAMIC QUEUE MANAGEMENT OF NETWORK TRAFFIC

TECHNICAL FIELD

The present disclosure relates generally to network data forwarding, and queue and buffer management for data packets and more particularly to real-time dynamic allocation and re-allocation of buffers.

BACKGROUND

Computer network devices are utilized in smart homes, smart buildings, organizations, universities, companies, and countries. The wide distribution of computer networks is a consequence of many factors, and among these is the emerging of the Internet-of-Things (IoT). The ever-increasing use of computer networks has resulted in increasing computer crimes and cyber-attacks. Moreover, the connected terminals throughout these networks add a heavy load on the network resources and devices. As a result, the amount of data transferred across the network devices, such as computers and routers, greatly increases. To share the network resources, the transferred data are divided into packets. Every device that generates packets must be temporarily stored at the router buffer before forwarding to the next router or its destination. When the router buffer becomes full, congestion occurs, and it will lead to the case of packet loss.

Network packet routers use buffer management techniques to share limited buffer space between various incoming data ports and classes of data packets. Typically, the packets are divided into cells that are managed by a set of queues. Packets from multiple ports are en-queued to multiple queues based on their classified priority and de-queued based on available bandwidth of the shared output port(s). Often the available output bandwidth is less than the aggregate input bandwidth and packets must be dropped because there is limited shared buffer memory. Packets are dropped by either not en-queuing them at the tail of the queue for processing, or by de-queuing from the head of the queue and simply not processing them. If there is efficient buffer management of the shared buffer memory, overall loss performance can be improved, i.e., the packet drop rate can be minimized. However, there are many restrictions on implementing a buffer management scheme. The hardware implementing the management should operate at the rate of the incoming packets, and this rate approaches the maximum rate that can be realized using current memory technology.

Routers use buffer allocation techniques to share limited buffer space between various incoming data ports and classes of data packets. Packets from multiple ports are en-queued to multiple queues based on their classified priority and de-queued based on available bandwidth of the shared output port(s). To ensure that higher priority traffic receives a guaranteed share of the buffer space, network administrators typically employ a statically configured buffer allocation. However, this kind of fixed allocation typically requires over allocation in favor of higher priority traffic classes. The fixed allocation scheme is sub-optimal because these over-allocated buffers cannot be used for other lower priority traffic even when they are underutilized by the higher priority traffic classes for which the buffers were statically allocated.

Accordingly, it can be difficult to train models to identify anomalous, and potentially malicious, authentication events.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
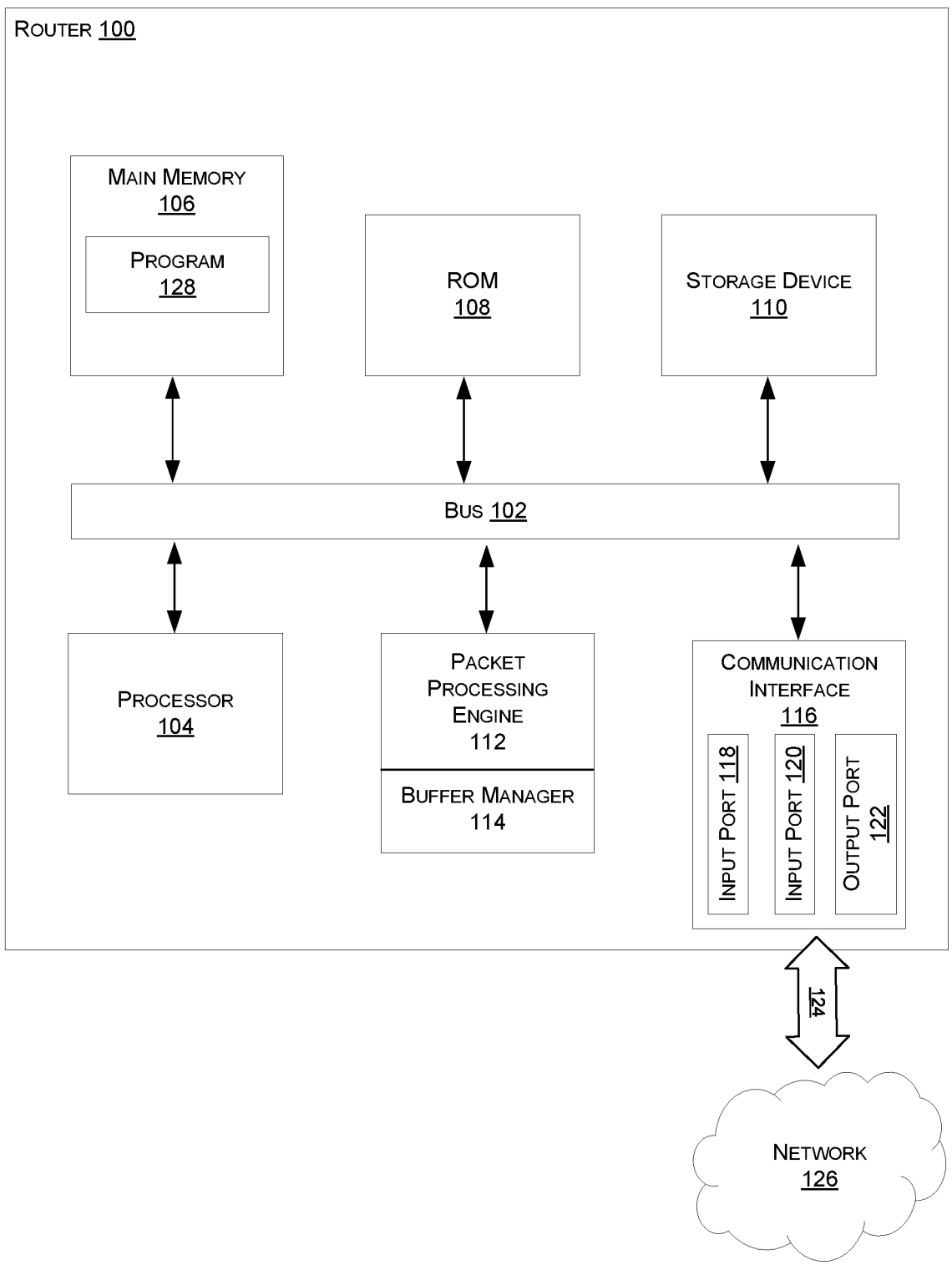
FIG. 1 illustrates an exemplary router in which methods and systems for buffer re-allocation may be implemented, according to at least some examples.

The present disclosure relates generally to generally to network data forwarding, and queue and buffer management for data packets and more particularly to real-time dynamic allocation and re-allocation of buffers.

A method as described herein may include monitoring traffic through a network system using an application hosted in a user space of a network device. The monitoring may include long-term monitoring of queue balances and loads. The method may also include determining, in response to monitoring the traffic, that a load of a first queue of the network system is approaching full capacity. The method may include determining that the first queue is approaching full capacity based on a slope of the load of the queue over time reaching a predetermined threshold. The method also includes calculating, using a packet filter of a virtual machine of the network system, a likelihood score indicative of a probability that the load will exceed a capacity limit within a predetermined time period. In some examples, the likelihood score is calculated in a kernel space of a server system. In some examples, the likelihood score may be calculated using a predictive model such as a Lyapunov exponent or Kalman filter. The method also includes re-balancing the first queue with at least one second queue of the network system in response to the likelihood score exceeding a predetermined threshold. In some examples, the method may include calculating, using the packet filter in the kernel space, a second likelihood score indicative of a probability that the load will reduce within a time period and stopping the packet filter in the kernel space in response to the likelihood score exceeding a threshold. In some examples, the application in the user space may include a long-term component and a real-time component, the long-term component used for determining the load of the first queue and the real-time component used for calculating the likelihood score. Other embodiments of this aspect include corresponding computer systems, apparatus, and computer programs recorded on one or more computer storage devices, each configured to perform the actions of the methods.

Additionally, the techniques of the method, and any other techniques described herein, may be performed by a system and/or device having non-transitory computer-readable media storing computer-executable instructions that, when executed by one or more processors, performs the method(s) described above.

EXAMPLE EMBODIMENTS

This disclosure describes techniques for queue and buffer management in or near real-time. In some instances, typical solutions have included serialized packets distributed to queues to allow for allocation of traffic to parallel tracks, with a prioritization system based on packet priority labels (e.g., DSCP). Arbitrating between label allocations between queues and organizing the priority system remains a difficult problem, particularly to resolve in a dynamic and near real-time manner. With static allocation methods, traffic labels are allocated to individual queues based on the characteristics of each label and an expectation of traffic volume through the interface. For instance, each label, packets of a particular size are received at a particular rate with a threshold number of packets allowed in the queue. In such examples, oversubscription can cause packets to be dropped when a packet is allocated to a queue with no remaining capacity. Other parallel queues may have availability, but due to the static method of allocation, the packets are not routed to available locations in the parallel queues. In typical dynamic methods, oversubscription may be allowed based on availability in parallel queues. Such systems are largely semi-static. In these semi-static, dynamic, systems, an excess packet may enter the queue if parallel queues have availability.

This disclosure relates to a dynamic mechanism for traffic allocation and queue management that anticipates traffic that may enter the parallel queues and therefore is able to resolve oversubscription with efficiency, thereby efficiently using resources, and also dynamically re-configure the parallel queues in real-time based on a traffic expectation. By dynamically re-configuring based on traffic expectations, the method is able to avoid dropped packets due to oversubscription and is able to efficiently and accurately handle variable traffic loads.

Accordingly, this disclosure relates to a method based on an Extended Berkeley Packet Filter (eBPF) that dynamically re-allocated buffer queues in real-time based on network traffic trends. The method involves using a queue buffer structure that may be used as a typical static or dynamic allocation system with a structural difference that queue volumes for each of the queues represent a lower bound of admitted traffic in each queue. For example, in a particular queue that handles video, during use and when present the queue should net receive less than a threshold amount of the video data type. During active management of the queue buffer, a Queue Management Logic daemon (QML) may be used to monitor traffic through one or more queues. The traffic may be sorted by labels and types (e.g., Voice, OAM, etc.). The QML includes a long-term component that monitors a change in load for the queue and associated buffer. The long-term component monitors the change of load and measures a change in volume for the queue from a first time interval to a second time interval. As monitored by the long-term component of the QML, as a queue approaches full capacity, the method dynamically re-allocates the queue before any packets are dropped or lost. Additionally, adjusting for traffic oversubscription too early may result in failures, especially for highly volatile traffic loads that may appear in bursts. Accordingly, a static or semi-static system that fails to anticipate an overload of queue capacity before occurrence will result in lost traffic while a system that acts too far in advance will fail to anticipate bursts that may cause oversubscription. As such, the long-term component may be used to identify one or more queues that are approaching full capacity. The calculation may be based on a slope of the load of a particular queue over time reaching a critical threshold that may be indicative of a likelihood for the queue to reach capacity in the near future.

The QML also includes a short-term component that, in response to the long-term component identifying a queue reaching full capacity, calls the eBPF, that functions in a kernel space and may perform faster computations than a user-space application. The eBPF, when activated, determines a short-term likelihood for each queue to reach full capacity within a predetermined threshold of time. The short-term likelihood may be performed using a predictive model such as a Lyapunov exponent or a Kalman filter, among other predictive algorithm techniques. The short-term likelihood may determine whether the queue is likely to (1) reach or exceed a capacity limit in the near future, (2) suddenly reduce the current load (e.g., when susceptible to especially bursty traffic loads), or (3) neither exceed a capacity nor suddenly reduce the load. Because the computation is performed by the eBPF, it may be computed in near real-time. Generally, the eBPF is configured to compare trajectories of queue loads in the system with nearest identical or similar trajectories from the past. The system is then able to indicate a likelihood of the queue to overflow, collapse, or maintain at a current level based on previous queue traffic observed by the eBPF.

When the eBPF determines that one or more queues are likely to exceed capacity in the near future, then the eBPF may dynamically re-allocate the queues based on the computed likelihood. The re-allocation may be performed to reallocate segments of buffer space within the structured admitted traffic levels defined by the queue structure (as described above). In such examples, the method performs the short-term determination and re-allocates when necessary to avoid an oversubscription and ensuing packet loss while also accounting for volatility and divergence of capacity for each of the parallel queues. In this manner, the method may enable re-allocation that not only accounts for future oversubscription of a single queue, but also anticipates potential oversubscription of adjacent queues, for example due to upcoming bursts in traffic on parallel queues, and avoids re-allocating in a manner that may cause oversubscription of the parallel queues. Further, when the eBPF determines that the queues are not at risk of exceeding capacity limits, for example by determining that a likelihood of oversubscription is below a certain threshold, then the eBPF stops and monitoring function continues on the long-term component of the QML, which is less resource intensive. Accordingly, as described above, the method accounts for real-time reallocation of queues that balances oversubscription and starving of queues while also accounting for anticipated or upcoming traffic loads.

Although the techniques described herein are primarily with respect to authentications performed by an authentication platform, the techniques are equally applicable across any industry, technology, environment, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Turning now to the figures, FIG. 1 illustrates a router 100 in which methods and systems for buffer re-allocation may be implemented, according to at least some examples. Router 100 includes a bus 102 or other communication mechanism for communicating information, and a processor 104 coupled with bus 102 for processing the information. Router 100 also includes a main memory 106, such as a random-access memory (RAM) or other dynamic storage device, coupled to bus 102 for storing information and instructions to be executed by processor 104. In addition, main memory 106 may be used for storing temporary variables or other intermediate information during execution of instructions to be executed by processor 104. Main memory 106 includes a program 128 for implementing the buffer reallocation methods described herein. Router 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

According to one embodiment, processor 104 executes one or more sequences of one or more instructions contained in main memory 106. Such instructions may be read into main memory 106 from another computer-readable medium, such as storage device 110. Execution of the sequences of instructions in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

Although described relative to main memory 106 and storage device 110, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 100 also includes a communication interface 116 coupled to bus 102. Communication interface 116 provides a two-way data communication coupling to a network link 124 that is connected to a network 126. The communication interface includes input ports 118 and 120, as well as an output port 122. One of ordinary skill in the art will recognize there may be numerous input and output ports. Wireless links may also be implemented. In any such implementation, communication interface 116 sends and receives signals that carry digital data streams representing various types of information.

Router 100 further includes at least one packet processing engine (PPE) 112 to process packet headers and determine the next hop of the packet. In order to store and manage the packets during processing, PPE 112 includes a buffer manager 114. In some examples, the buffer manager 114 may provide the queue re-allocation according to the systems and the methods described herein.

Figure 2:
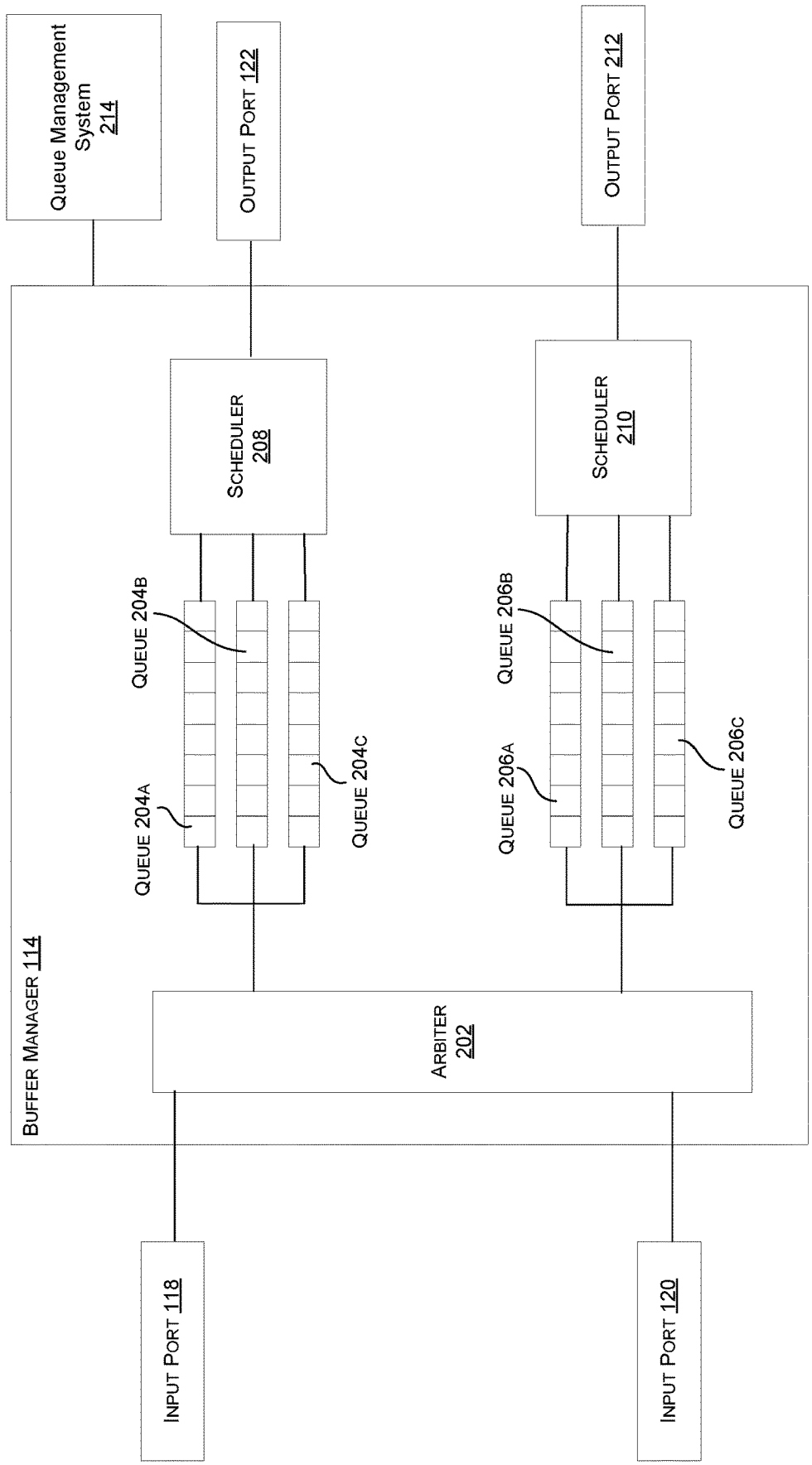
FIG. 2 illustrates an example of a buffer manager for monitoring, balancing, and dynamically re-allocating buffers in real-time, according to at least some examples.

FIG. 2 illustrates an example of a buffer manager 114 for monitoring, balancing, and dynamically re-allocating buffers in real-time, according to at least some examples. Buffer manager 114 comprises a plurality of queues 204 and 206 corresponding to a set of output ports 122 and 212, with each output port having a set of queues corresponding to a parallel queues that may be processes simultaneously. In an exemplary embodiment consistent with the present invention, buffer manager 114 includes queues 204a, 204b, and 204c (collectively queues 204) allocated to output port 122 and having three priority levels respectively, and queues 206a, 206b, and 206c (collectively queues 206) allocated to output port 212. One of ordinary skill in the art will recognize that there may be any number of ports or queues that may be assigned to different priority levels, labels, traffic types, etc. Queues 204 and 206 are allocated from memory, for example, main memory 106, in units of memory called "buffers." Because there is inherently a finite amount of memory there is a need to optimize the amount of memory used by queues 204 and 206. During periods of high traffic within the router 100, it is possible to consume all of the available buffer space.

Packets received from any of the input ports, are enqueued to the queues of the output port for which they are destined via arbiter 202. Arbiter 202 determines if the packet can be enqueued to one of the queues 204 destined for output port 122 depending upon the labels or priority of the incoming packet. The buffer manager 114 may include, or be in communication with a queue management system, such as a QML daemon that may include a long-term component in a user space and a short-term component in a kernel space. In some examples, the short-term and long-term components may both operate in one of either the user space or kernel space. The long-term component may operate in a user space, as described below with respect to FIG. 4, and monitors a change in load for each of the queues 204 and 206. The long-term component monitors the change of load and measures a change in volume for the queues 204 and 206 from a first time interval to a second time interval. As monitored by the long-term component, as a queue of the queues 204 and 206 approaches full capacity, the buffer manager 114 dynamically re-allocates the queue before any packets are dropped or lost. The long-term component may be used to identify one or more queues 204 and 206 that are approaching full capacity. The calculation may be based on a slope of the load of a particular queue over time reaching a critical threshold, as shown and described with respect to FIG. 3, that may be indicative of a likelihood for the queue to reach capacity in the near future. The calculation may be performed by the queue management system 214.

In typical systems, a queue that approaches oversubscription may drop a packet when the queue is full. In contrast, the method described herein uses the queue management system 214 to identify queues 204 and 206 that may approach full capacity and also includes a short-term component. The short-term component may operate in a kernel space, as described with respect to FIG. 4 and may perform faster computations than a user-space application. The short-term component of the queue management system 214, when activated in response to the long-term component identifying a queue that may be approaching capacity, determines a short-term likelihood for each queue 204 and 206 to reach full capacity within a predetermined threshold of time. The short-term likelihood may be performed using a predictive model such as a Lyapunov exponent or a Kalman filter, among other predictive algorithm techniques as will be appreciated by those with skill in the art. The short-term likelihood may determine whether the queue is likely to (1) reach or exceed a capacity limit in the near future, (2) suddenly reduce the current load (e.g., when susceptible to especially volatile traffic loads), or (3) neither exceed a capacity nor suddenly reduce the load. Because the computation is performed in the kernel space, it may be computed in near real-time. Generally, the short-term component is configured to compare trajectories of queue loads in the system with nearest identical or similar trajectories from the past. The system is then able to indicate a likelihood of the queue to overflow, collapse, or maintain at a current level based on previous queue traffic observed by the short-term component.

When the queue management system 214 determines that one or more queues 204 and 206 are likely to exceed capacity in the near future, then the buffer manager 114 may dynamically re-allocate the queues based on the computed likelihood. The re-allocation may be performed to reallocate segments of buffer space within the structured admitted traffic levels defined by the queue structure. In such examples, the buffer manager 114 re-allocates when necessary to avoid an oversubscription and ensuing packet loss while also accounting for volatility and divergence of capacity for each of the queues 204 and 206. In this manner, the method may enable re-allocation that not only accounts for future oversubscription of a single queue, but also anticipates potential oversubscription of adjacent queues, for example due to upcoming bursts in traffic on parallel queues, and avoids re-allocating in a manner that may cause oversubscription of the parallel queues. Further, when the queue management system 214 determines that the queues 204 and 206 are not at risk of exceeding capacity limits, for example by determining that a likelihood of oversubscription is below a certain threshold, then the kernel space application stops and monitoring function continues on the long-term component of the queue management system 214, which is less resource intensive. Accordingly, as described above, the method accounts for real-time reallocation of queues that balances oversubscription and starving of queues while also accounting for anticipated or upcoming traffic loads.

Schedulers 208 and 210 de-queue packets from queues 204 and 206 respectively. The schedulers 208 and 210 attempt to ensure that they are sending an appropriate amount of traffic the output ports 122 and 212 to avoid packet dropping. Schedulers 208 and 210 manage access to a fixed amount of output port 122, 212 bandwidth by selecting the next packet that is transmitted on an output port 122, 195. Scheduler 208 and 210 pull packets from each queue 204 and 206 and send the traffic to the output ports 122, 212. Congestion occurs when packets arrive at an output port 122, 212 faster than they can be transmitted, hence need for queuing to tide over temporary congestion.

Incoming traffic is already classified into p different priority levels supporting possible traffic requirements. For example, where p=3 there may be: 1) high priority traffic that should not be dropped if possible, 2) low-latency traffic that should be de-queued first because it is time sensitive, and 3) best effort (or low priority) traffic that should be dropped first when buffer space becomes scarce. In some examples, rather than different levels, each of the levels may be applied to a particular label (e.g., voice data, video data, image data, etc.) with each of the different labels applied to different parallel queues. These priority levels or labels are either indicated within the packets themselves, or can be derived from various other parameters derived from the packet or state maintained in the router 100. Those of ordinary skill in the art will understand there to be many possible bases for classification.

The arbiter 202 receives one packet per processor cycle from one of the input ports 118 and 120, including the information specifying the packet's priority level. The arbiter 210 places the packet into the queue corresponding to the priority level or label for the destination port. For example, where the packet was destined on output port 122, the buffer manager 114 would place the packet in queue 204a if the priority level were "high priority," 204b if the priority level were "low latency," and 204c if the priority level were "best effort," in accordance with the exemplary priority levels listed above. In some examples, described herein, the different queues may correspond to different labels of packets received at input ports 118 and 120. In some examples, the arbiter 202 may be in communication with the queue management system 214 and may perform the dynamic re-allocation as instructed by the queue management system 214.

Figure 3:
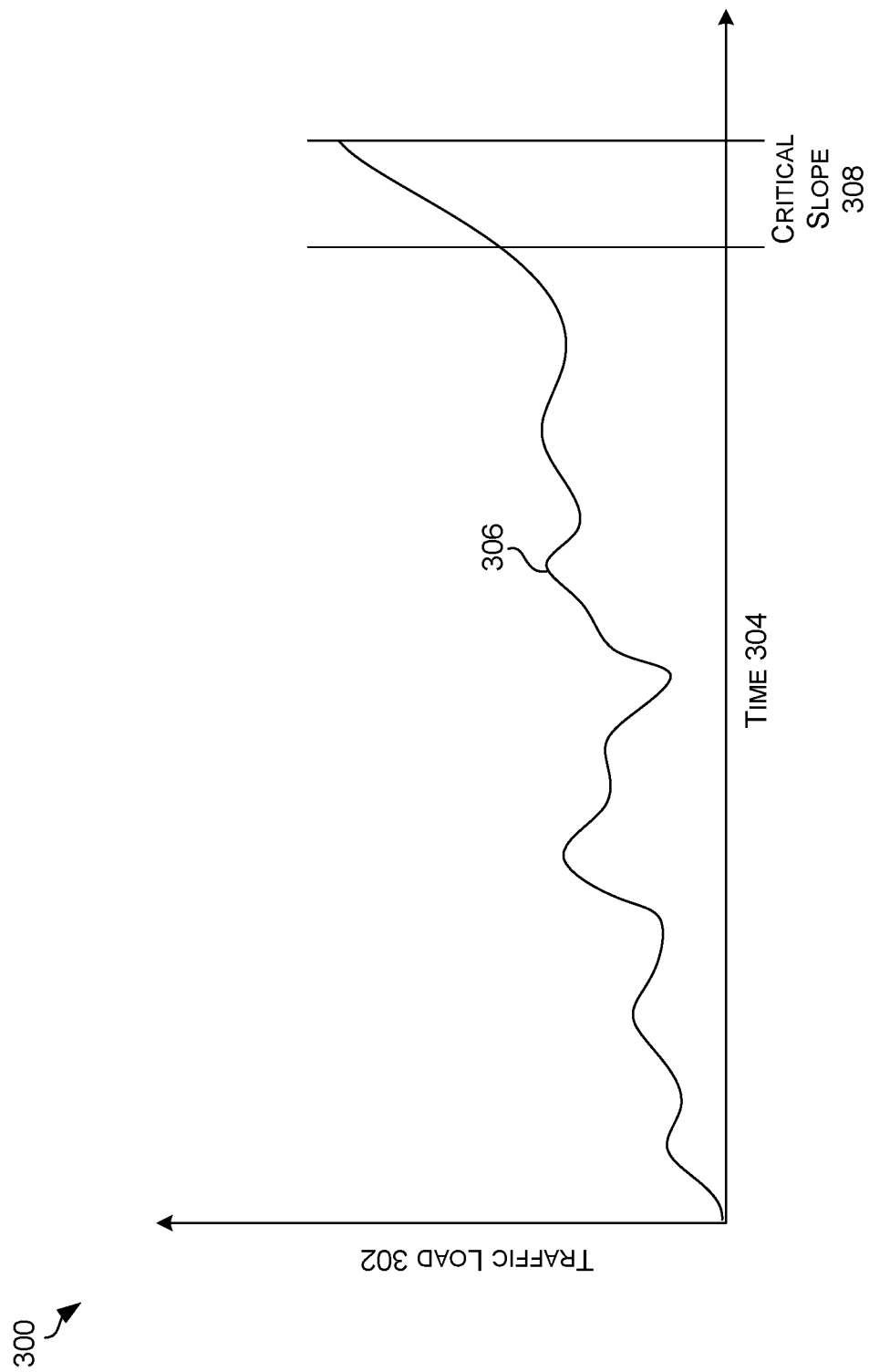
FIG. 3 illustrates an example chart of network traffic load in a queue as a function of time that may be used to identify a critical slope and trigger a real-time dynamic re-allocation of network traffic.

FIG. 3 illustrates an example of a chart 300 of network traffic load 306 in a queue as a function of time that may be used to identify a critical slope and trigger a real-time dynamic re-allocation of network traffic. The chart 300 includes a horizontal (independent) axis corresponding to time 304 and a vertical (dependent) axis corresponding to a traffic load for a particular queue, such as one of queues 204 or 206. The network traffic load 306 fluctuates over time and may increase or decrease based on current traffic demands. The slope of the network traffic load 306 may be monitored by the queue management system 214 to identify instances where a slope of the network traffic load reaches a critical slope 308. The critical slope 308 may be determined at or near real-time and may be over a predetermine period of time, such that a potential overload would be likely to occur in the near future. Upon determining that the network traffic load 306 has reached the critical slope 308, the queue management system 214 may activate the eBPF to perform a likelihood determination, whether the network traffic load 306 is likely to reach or exceed the queue capacity. The network traffic load 306 of different queues, such as queues 204 and 206 may be monitored simultaneously.

Figure 4:
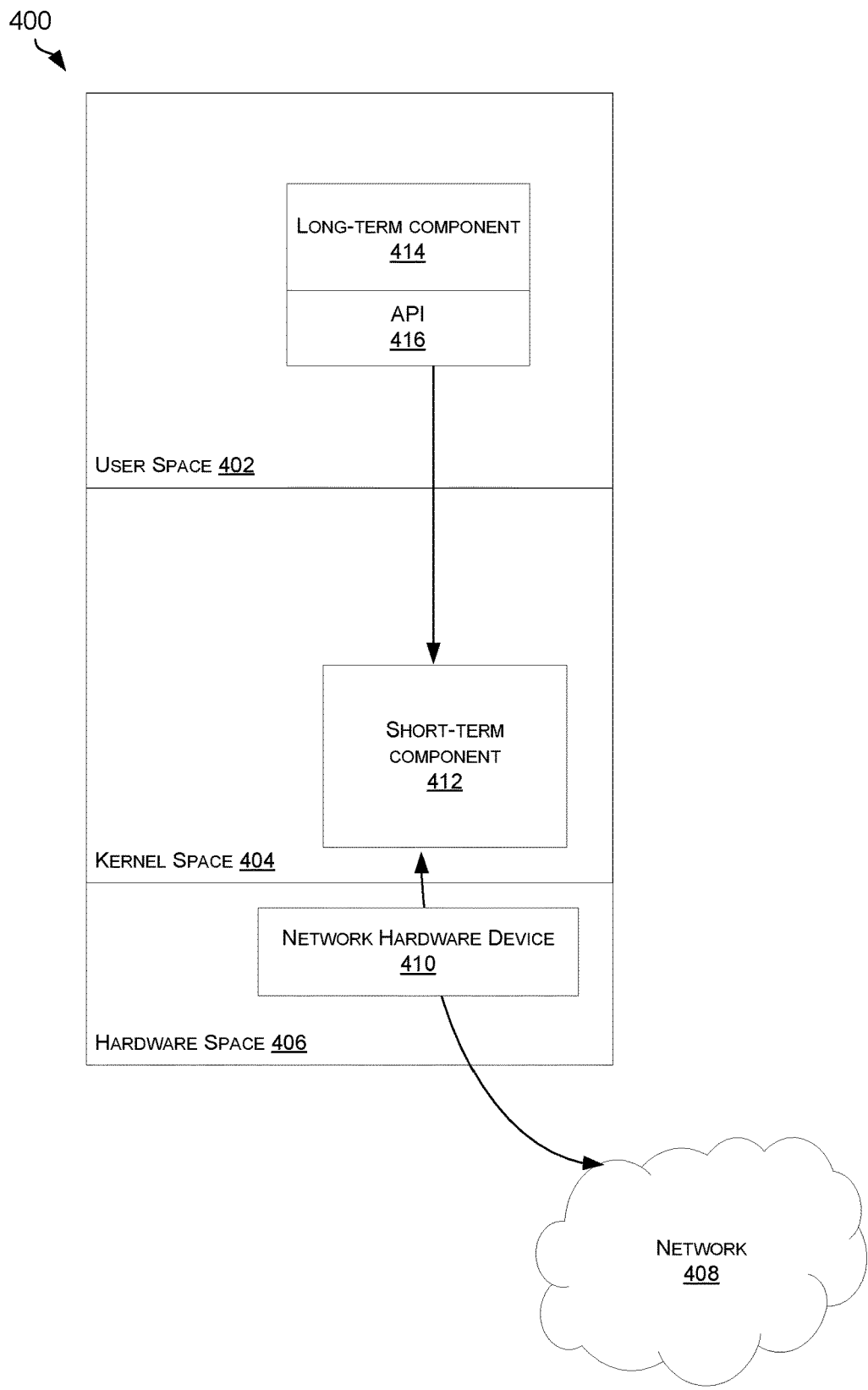
FIG. 4 illustrates an example diagram for transferring data and processes between a user space and a kernel space associated with a server, according to at least some examples.

FIG. 4 illustrates an example diagram 400 for performing queue management from a user space 402 as well as a kernel space 404 associated with a server, according to at least some examples. User space 402 includes user software application programs that carry out various useful tasks by accessing underlying services provided by kernel space 404. In particular, a queue management system 214 of the buffer manager 114 provides instructions for an eBPF to perform a likelihood computation in the kernel space 404. A long-term component of a QML is embodied in the user space 402 to perform long-term monitoring of queue traffic loads and identify queues that may reach capacity in the near future. An application program interface (API) 416 provides formalized software interrupts to access the underlying services provided by kernel space 404. A signal from the API 416 signals kernel space 414 that a queue management system, such as queue management system 214 or a queue management logic daemon, has identified that one or more queues are nearing full capacity and may require re-allocation of packets on the buffer.

Kernel space 404 provides the system-level commands and functions that manage system resources such as device drivers, memory management routines, scheduling and system calls, for example. In general, device drivers provide the necessary software components that permit the server to communicate with platform hardware devices associated with a hardware space that provides the actual physical computing machinery. In particular, a short-term component 412 provides for computation of likelihood scores, as described above, describing a likelihood that the identified queue will reach or exceed capacity in the near future, e.g., within a predetermined period of time. In some examples, the short-term component may be implemented on an eBPF.

Hardware space 406 includes components such as liquid crystal displays (LCD) panels, video adapters, integrated drive electronics (IDEs), network hardware device, CD-ROMs, memory structures and hard disk controllers, for example. A network hardware device enables network interface functionality that allows a server to transmit and receive data communications with the external environment, e.g., network 408.

Figure 5:
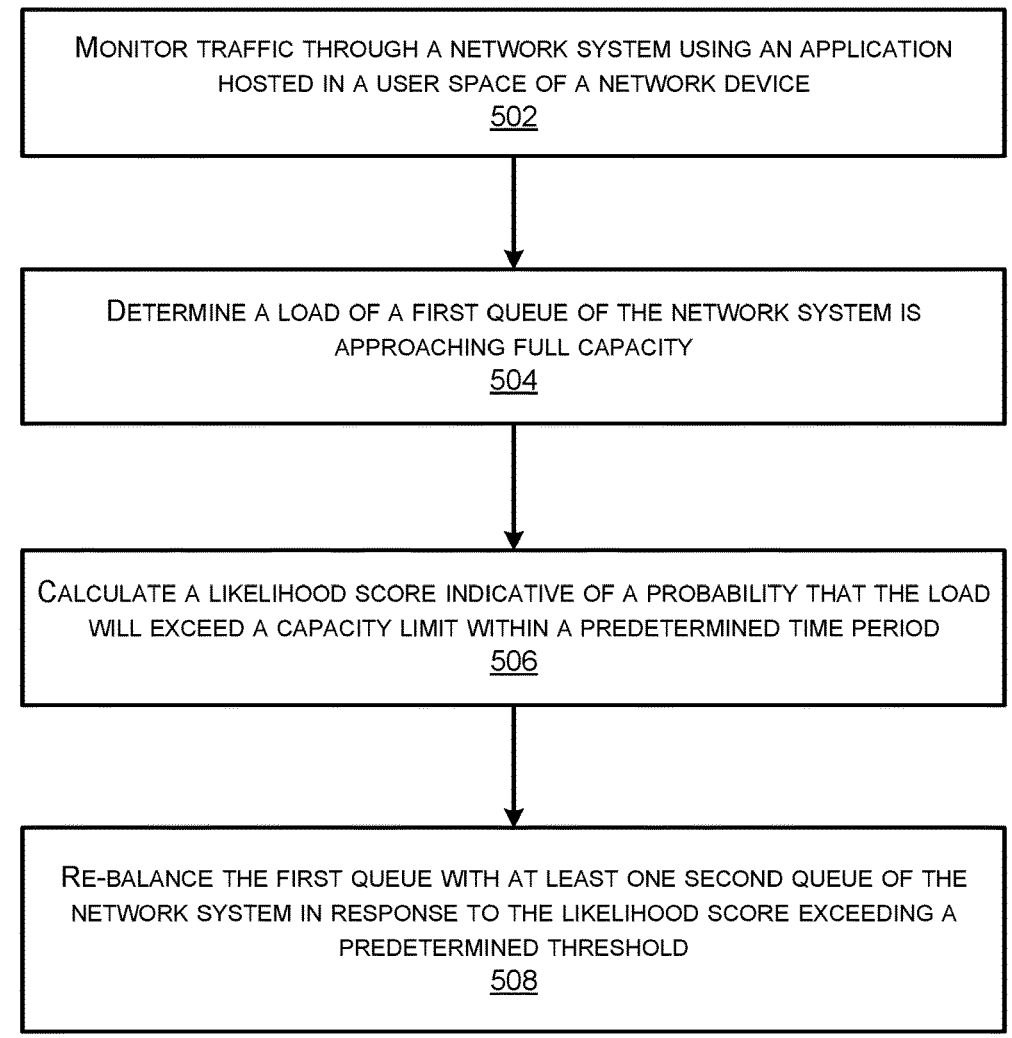
FIG. 5 illustrates a flow diagram of an example method for real-time dynamic re-allocation of network buffer queues, according to at least some examples.

FIG. 5 illustrates a flow diagram of a process 500 for real-time dynamic re-allocation of network buffer queues, according to at least some examples. In some examples, the steps depicted may be implemented in software executed by a processor, such as a processor of a router 100, a processor operating in a user space, a processor operating in a kernel space, or other computing device or combination thereof. Though the logical flow diagrams are shown in a particular order, the order of the processes may be different in some examples. The process 500 as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, some or all of the process 500 may be performed locally on the carts as described herein, and some or all of the processes may be performed at a remote computing system, such as a cloud computing system with which the carts are in network communication.

At 502, the process 500 includes monitoring traffic through a network system using an application hosted in a user space of a network device. The monitoring of traffic may be performed by a management system of the network system and may be configured to monitor a load of one or more parallel queues in real-time. The traffic may be monitored by a queue management logic daemon or other queue management system. In some examples, the queue management occurs in a user space of a network device, though in other examples the monitoring may take place in a kernel space or other location, such as a remote location.

At 504, the process 500 includes determining a load of a first queue of the network system is approaching full capacity. The first queue may be one of several queues in the network system and may be determined to approach capacity by identifying a slope of the traffic load as a function of time reaching a threshold. At such threshold amounts, the traffic may be expected to exceed capacity in the near future unless traffic is re-allocated. The determination may be made by a queue management system by monitoring traffic over windows of time, such that the slope is always determined over a consistent window of time.

At 506, the process 500 includes calculating a likelihood score indicative of a probability that the load will exceed a capacity limit within a predetermined time period. In response to the determination at 504, the queue management system may activate a software component, such as an eBPF, that may operate in a kernel space as described herein, to perform the likelihood score calculation. The eBPF, when activated, determines a short-term likelihood for each identified queue to reach full capacity within a predetermined threshold of time. The short-term likelihood may be performed using a predictive model such as a Lyapunov exponent or a Kalman filter, among other predictive algorithm techniques. The short-term likelihood may determine whether the queue is likely to (1) reach or exceed a capacity limit in the near future, (2) suddenly reduce the current load (e.g., when susceptible to especially volatile traffic loads), or (3) neither exceed a capacity nor suddenly reduce the load. Because the computation is performed by the eBPF in the kernel space, it may be computed in near real-time. Generally, the eBPF is configured to compare trajectories of queue loads in the system with nearest identical or similar trajectories from the past. The system is then able to indicate a likelihood of the queue to overflow, collapse, or maintain at a current level based on previous queue traffic observed by the eBPF.

At 508, the process 500 includes re-balancing the first queue with at least one second queue of the network system in response to the likelihood score exceeding a predetermined threshold. When the eBPF determines that one or more queues are likely to exceed capacity in the near future, then the eBPF may dynamically re-allocate the queues based on the computed likelihood. The re-allocation may be performed to reallocate segments of buffer space within the structured admitted traffic levels defined by the queue structure (as described above). In such examples, the process 500 includes re-allocating when necessary to avoid an oversubscription and ensuing packet loss while also accounting for volatility and divergence of capacity for each of the parallel queues. In this manner, the method may enable re-allocation that not only accounts for future oversubscription of a single queue, but also anticipates potential oversubscription of adjacent queues, for example due to upcoming bursts in traffic on parallel queues, and avoids re-allocating in a manner that may cause oversubscription of the parallel queues. Further, when the eBPF determines that the queues are not at risk of exceeding capacity limits, for example by determining that a likelihood of oversubscription is below a certain threshold, then the eBPF stops and monitoring function continues on the long-term component of the QML, which is less resource intensive.

The re-allocation may include performing a likelihood determination for multiple of the queues, for example to determine a likelihood that a traffic load will increase to a level that would cause oversubscription if reallocated traffic is directed to a second queue. In this manner, the re-allocation is truly dynamic and real-time and anticipates volatile changes in a first queue that may overload while also preventing causing cascading oversubscription by re-allocating to queues that may receive bursts of traffic that may cause oversubscription.

Figure 6:
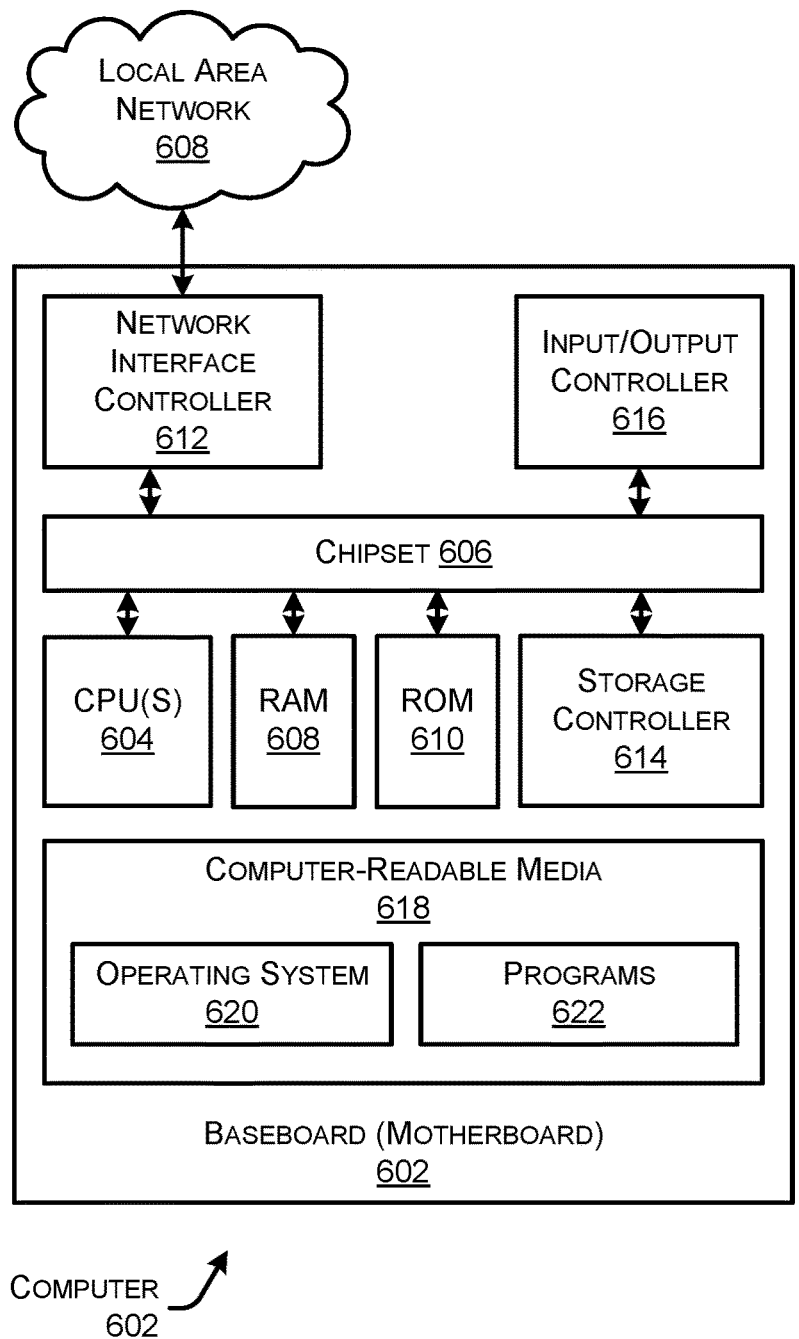
FIG. 6 is a computer architecture diagram showing an illustrative computer hardware architecture for implementing a computing device that can be utilized to implement aspects of the various technologies presented herein.

FIG. 6 is an architecture diagram for a computer 600 showing an illustrative computer hardware architecture for implementing a computing device that can be utilized to implement aspects of the various technologies presented herein. The computer architecture shown in FIG. 6 illustrates a conventional server computer, workstation, desktop computer, laptop, tablet, network appliance, e-reader, smartphone, or other computing device, and can be utilized to execute any of the software components presented herein. In some examples, the computer 600 may be part of a system of computers, such as the router 100. In some instances, the computer 600 may be included in a system of devices that perform the operations described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage media 618 such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 126. The chipset 606 can include functionality for providing network connectivity through a network interface controller (NIC) 612, such as a gigabit Ethernet adapter. The NIC 612 is capable of connecting the computer 600 to other computing devices over the network 126. It should be appreciated that multiple NICs 612 can be present in the computer 600, connecting the computer to other types of networks and remote computer systems.

The computer 600 can include storage 614 (e.g., disk) that provides non-volatile storage for the computer. The storage 614 can consist of one or more physical storage units. The storage 614 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage 614 by detecting the physical states or characteristics of one or more particular locations within the physical storage units.

In addition to the storage 614 described above, the computer 600 can have access to other computer-readable storage media 618 to store and retrieve information, such as programs 622, operating system 620, data structures, or other data. It should be appreciated by those skilled in the art that computer-readable storage media 618 is any available media that provides for the non-transitory storage of data and that can be accessed by the computer 600. Some or all of the operations performed by any components included therein, may be performed by one or more computer(s) 600 operating in a network-based arrangement.

By way of example, and not limitation, computer-readable storage media 618 can include volatile and non-volatile, removable and non-removable media implemented in any method or technology. Computer-readable storage media 618 includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The computer-readable storage media 618 can store an operating system 620 utilized to control the operation of the computer 600. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The computer-readable storage media 618 can store other system or programs 622 and data utilized by the computer 600.

In one embodiment, the computer-readable storage media 618, storage 614, RAM 608, ROM 610, and/or other computer-readable storage media may be encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various techniques described above. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for dynamic packet reallocation, the method comprising:
monitoring traffic through a network system using an application hosted in a user space of a network device;
determining, in response to monitoring the traffic, a load of a first queue of the network system is approaching full capacity;
calculating, using a packet filter of a virtual machine of the network system, a likelihood score indicative of a probability that the load will exceed a capacity limit within a predetermined time period; and
re-balancing the first queue with at least one second queue of the network system in response to the likelihood score exceeding a predetermined threshold.

2. The method of claim 1, wherein determining the load of the first queue is approaching full capacity comprises determining that a rate of change in a queue capacity exceeds a predetermined threshold.

3. The method of claim 2, wherein calculating the likelihood score is performed in a kernel space of a server system.

4. The method of claim 3, wherein calculating the likelihood score comprises using a predictive model to determine a likelihood that the load will exceed the capacity limit.

5. The method of claim 3, further comprising calculating, using the packet filter in the kernel space, a second likelihood score indicative of a probability that the load will reduce within the predetermined time period; and
stopping the packet filter in the kernel space in response to the second likelihood score exceeding a predetermined threshold.

6. The method of claim 1, wherein the packet filter uses a Lyapunov exponent to determine the likelihood score.

7. The method of claim 1, wherein the application in the user space comprises a long-term component and a real-time component, the long-term component used for determining the load of the first queue and the real-time component used for calculating the likelihood score.

8. A system comprising:
one or more processors; and
one or more non-transitory computer-readable media storing computer-executable instructions that, when executed by the one or more processors, cause the one or more processors to perform operations comprising:
monitor traffic through a network system using an application hosted in a user space of a network device;
determine, in response to monitoring the traffic, a load of a first queue of the network system is approaching full capacity;
calculate, using a packet filter of a virtual machine of the network system, a likelihood score indicative of a probability that the load will exceed a capacity limit within a predetermined time period; and
re-balance the first queue with at least one second queue of the network system in response to the likelihood score exceeding a predetermined threshold.

9. The system of claim 8, wherein determining the load of the first queue is approaching full capacity comprises determining that a rate of change in a queue capacity exceeds a predetermined threshold.

10. The system of claim 9, wherein calculating the likelihood score is performed in a kernel space of a server system.

11. The system of claim 10, wherein calculating the likelihood score comprises using a predictive model to determine a likelihood that the load will exceed the capacity limit.

12. The system of claim 10, wherein the computer-executable instructions further cause the one or more processors to:
calculate, using the packet filter in the kernel space, a second likelihood score indicative of a probability that the load will reduce within the predetermined time period; and
stop the packet filter in the kernel space in response to the second likelihood score exceeding a predetermined threshold.

13. The system of claim 8, wherein the packet filter uses a Lyapunov exponent to determine the likelihood score.

14. The system of claim 8, wherein the application in the user space comprises a long-term component and a real-time component, the long-term component used for determining the load of the first queue and the real-time component used for calculating the likelihood score.

15. A controller device comprising:
one or more processors; and
one or more non-transitory computer-readable media storing computer-readable instructions that, when executed by one or more processors, cause the one or more processors to:
monitor traffic through a network system using an application hosted in a user space of a network device;
determine, in response to monitoring the traffic, a load of a first queue of the network system is approaching full capacity;
calculate, using a packet filter of a virtual machine of the network system, a likelihood score indicative of a probability that the load will exceed a capacity limit within a predetermined time period; and
re-balance the first queue with at least one second queue of the network system in response to the likelihood score exceeding a predetermined threshold.

16. The controller device of claim 15, wherein determining the load of the first queue is approaching full capacity comprises determining that a rate of change in a queue capacity exceeds a predetermined threshold.

17. The controller device of claim 16, wherein calculating the likelihood score is performed in a kernel space of a server system.

18. The controller device of claim 17, wherein calculating the likelihood score comprises using a predictive model to determine a likelihood that the load will exceed the capacity limit.

19. The controller device of claim 17, wherein the computer-readable instructions further cause the one or more processors to:
    calculate, using the packet filter in the kernel space, a second likelihood score indicative of a probability that the load will reduce within the predetermined time period; and
    stop the packet filter in the kernel space in response to the second likelihood score exceeding a predetermined threshold.

20. The controller device of claim 15, wherein the application in the user space comprises a long-term component and a real-time component, the long-term component used for determining the load of the first queue and the real-time component used for calculating the likelihood score.

* * * * *